United States Patent
Jones et al.

(10) Patent No.: US 8,026,625 B2
(45) Date of Patent: Sep. 27, 2011

(54) POWER GENERATION SYSTEMS AND METHODS

(75) Inventors: Jack A. Jones, Los Angeles, CA (US); Yi Chao, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 566 days.

(21) Appl. No.: 12/103,626

(22) Filed: Apr. 15, 2008

(65) Prior Publication Data

US 2009/0127859 A1    May 21, 2009

Related U.S. Application Data

(60) Provisional application No. 60/936,368, filed on Jun. 20, 2007.

(51) Int. Cl.
*F03B 13/00* (2006.01)
*H02P 9/04* (2006.01)

(52) U.S. Cl. ............. 290/54; 290/43; 290/53; 290/55

(58) Field of Classification Search ............. 290/43, 290/53–55; 60/398
See application file for complete search history.

(56) References Cited

U.S. PATENT DOCUMENTS

| | | | | |
|---|---|---|---|---|
| 1,010,591 | A * | 12/1911 | Clements | 290/55 |
| 3,952,723 | A * | 4/1976 | Browning | 126/247 |
| 3,986,787 | A | 10/1976 | Mouton, Jr. et al. | 415/7 |
| 4,031,702 | A * | 6/1977 | Burnett et al. | 60/398 |
| 4,055,950 | A * | 11/1977 | Grossman | 60/398 |
| 4,095,918 | A | 6/1978 | Mouton, Jr. et al. | 415/7 |
| 4,143,522 | A * | 3/1979 | Hamrick et al. | 62/324.1 |
| 4,149,092 | A * | 4/1979 | Cros | 290/54 |
| 4,206,608 | A * | 6/1980 | Bell | 60/698 |
| 4,274,010 | A * | 6/1981 | Lawson-Tancred | 290/55 |
| 4,379,388 | A * | 4/1983 | Williamson et al. | 60/398 |
| 4,382,618 | A * | 5/1983 | Grisebach | 285/124.4 |
| 4,383,182 | A | 5/1983 | Bowley | 290/43 |
| 4,496,846 | A * | 1/1985 | Parkins | 290/44 |
| 4,496,847 | A * | 1/1985 | Parkins | 290/44 |
| 4,498,017 | A * | 2/1985 | Parkins | 290/44 |
| 4,534,584 | A * | 8/1985 | Weirich et al. | 285/24 |
| 4,648,782 | A * | 3/1987 | Kraft | 414/735 |
| 4,843,250 | A * | 6/1989 | Stupakis | 290/53 |
| 5,027,000 | A * | 6/1991 | Chino et al. | 290/53 |
| 5,211,545 | A * | 5/1993 | Stornes | 417/330 |
| 5,281,856 | A | 1/1994 | Kenderi | 290/54 |
| 5,440,176 | A * | 8/1995 | Haining | 290/54 |
| 6,051,892 | A | 4/2000 | Toal, Sr. | 290/43 |
| 6,179,001 | B1 * | 1/2001 | Schutz | 137/614.03 |

(Continued)

OTHER PUBLICATIONS

Marten Grabbe Urban Lundin et al., "Ocean Energy", Department of Electricity and Lightning Research Uppsala University, pp. 1-21, Oct. 2001.

(Continued)

*Primary Examiner* — Pedro J Cuevas
(74) *Attorney, Agent, or Firm* — Steinfl & Bruno LLP

(57) ABSTRACT

A power generation system includes a plurality of submerged mechanical devices. Each device includes a pump that can be powered, in operation, by mechanical energy to output a pressurized output liquid flow in a conduit. Main output conduits are connected with the device conduits to combine pressurized output flows output from the submerged mechanical devices into a lower number of pressurized flows. These flows are delivered to a location remote of the submerged mechanical devices for power generation.

23 Claims, 7 Drawing Sheets

U.S. PATENT DOCUMENTS

| | | | |
|---|---|---|---|
| 6,555,931 B2 | 4/2003 | Mizzi | 290/54 |
| 6,652,221 B1 | 11/2003 | Praenkel | 415/3.1 |
| 6,798,080 B1 | 9/2004 | Baarman et al. | 290/43 |
| 6,806,586 B2 | 10/2004 | Wobben | 290/54 |
| 6,861,766 B2* | 3/2005 | Rembert | 290/43 |
| 7,183,664 B2* | 2/2007 | McClintic | 290/55 |
| 7,436,086 B2* | 10/2008 | McClintic | 290/55 |
| 7,569,943 B2* | 8/2009 | Kovach et al. | 290/44 |
| 7,656,055 B2* | 2/2010 | Torres et al. | 290/55 |
| 7,768,145 B2* | 8/2010 | Susman et al. | 290/54 |
| 7,944,073 B2* | 5/2011 | Van Drentham Susman et al. | 290/54 |
| 2005/0001432 A1* | 1/2005 | Drentham Susman et al. | 290/43 |
| 2008/0217110 A1* | 9/2008 | Stolten | 187/234 |
| 2008/0265583 A1* | 10/2008 | Thompson | 290/54 |
| 2009/0121487 A1* | 5/2009 | Fraenkel | 290/53 |
| 2009/0127859 A1* | 5/2009 | Jones et al. | 290/53 |
| 2010/0295312 A1* | 11/2010 | McMinn | 290/54 |

OTHER PUBLICATIONS

Jack A. Jones et al., "Developing a Proof-of-Principle Hydraulic Power Generation Device and Designing Phase Change Materials (PCM) Power Generation Integration to the Spray Glider", Auvsi Conference, pp. 1-4, Feb. 11, 2008.

Energy Savers: Ocean Wave Power; http://www.energysavers.gov/renewable_energy/ocean/index.cfm/mytopic=50009 , Dec. 30, 2008 retrieved on Jun. 11, 2009.

Michael C. Robinson, Ph.D., "Ocean Energy technology", pp. 1-34, Jun. 6, 2006.

"Technology White Paper on Ocean Current Energy Potential on the U.S. Outer Continental Shelf", Minerals Management Service Renewable Energy and Alernate Use program U.S. Department of the Interior, May 2006.

"2004 Survey of Energy Resources", World Energy Council, pp. 1-464, 2004.

Lawrence, S.R., Oceanic Energy, Leeds School of Business—University of Colorado http://leeds-faculty.colorado.edu/lawrence/syst6820/Lecture/Oceanic%20Energy.ppt, 2007, retrieved on Sep. 27, 2010, 1-83.

Pontes, M.T., et al., Ocean Energies: Resources and Utilisation, World Energy Council (WEC)—18$^{th}$ Congress, Buenos Aires Argentina, Oct. 2001, 1-16.

* cited by examiner

POWER GENERATION SYSTEMS AND METHODS

CROSS REFERENCE TO RELATED APPLICATIONS

The present application claims priority to U.S. Provisional Ser. No. 60/936,368 filed on Jun. 20, 2007, the contents of which are incorporated herein by reference in their entirety.

FEDERAL SUPPORT STATEMENT

The invention described herein was made in the performance of work under a NASA contract, and is subject to the provisions of Public Law 96-517 (35 USC 202) in which the Contractor has elected to retain title.

FIELD

The present disclosure relates to power generation. In particular, it relates to power generation systems and methods.

BACKGROUND

There are various types of power that can be generated from the motion of oceans, rivers and wind. One type is called Ocean Thermal Energy Conversion (OTEC). OTEC uses temperature differences at various ocean depths to generate power using any of a number of power generation techniques. OTEC is, in general, very inefficient (2-3% total efficiency) and costly compared to other types of ocean power generation schemes, and there are no known commercial power generation systems at present.

Another type of ocean energy uses ocean waves to generate power. In general, ocean wave energy systems are more expensive relative to conventional power plants, and they have significantly variable output from day to day.

Other sources of ocean energy are from large currents, such as the Gulf Stream, from rivers, from tidal currents and from off-shore wind, and are discussed in more detail below.

The generation of energy from major ocean currents, such as the Gulf Stream, appears quite feasible, although there are questions regarding how the installation of power turbines may affect the current and the environment. If one were to tap into the Gulf Stream where it comes closest to shore in South Florida, one could potentially capture perhaps as much as 5% of the total potential energy in the fastest portions of the flow. This would amount to about 1510 MW (see equation 1 below), or enough to power about 1.5 million homes in Florida.

$$\text{Power} = 0.5 * \text{rho} * \text{velocity}^3 * \text{area}, \quad \text{(Eq. 1)}$$

where
rho=1025 kg/m3
velocity=1.7 m/sec
area=100-m×30,000-m

The other source of ocean current energy is from ocean tides, or "tidal energy". Tidal energy is generated by the relative motion of the Earth, Sun, and the Moon, which interact via gravitational forces. Due to these, gravitational forces, water levels follow periodic highs and lows. Associated with these water level changes, there are tidal currents. The specific tidal motion produced at a certain location is the result of the changing positions of the Moon and Sun relative to the Earth, the effects of Earth, Earth rotation and the local shape of the sea floor One means of generating power using the tides is to construct barrage dams to trap the tide and then use hydroelectric power generators to electricity. There are three known systems worldwide, which use this type of power generation. They are located in France's Rance River, Canada's Bay of Fundy, and Russia's Kislaya Guba. These systems are considered environmentally damaging, however, in that they create silt buildups behind the dam, and they impair and damage the natural flow or marine life.

The other means of generating power is to use in-stream tidal generators, which make use of the kinetic energy from the moving water currents to power turbines, usually in a similar way that wind mills use moving air. This method is gaining in popularity because of low cost and low ecological impact. The first two tidal generators actually attached to a commercial power grid are in Hammerfast, Norway and in New York City's East River. Both of these systems use a windmill type of arrangement that is attached to the ground.

A description of the internal working of a tidal turbine (10) is shown in FIG. 1. The water current slowly turns a large turbine blade (20). The rotation is increased through a gearbox (30), and is converted to electricity by means of a rotating generator (40). Also shown in FIG. 1 are a rotor (50), seals and bearings (60), and a stationary housing (70). The power is then usually conditioned to the same voltage and phase as other turbines in the same water current, and the power lines (80) are buried until they reach the shore, where they are connected to a commercial power grid.

The primary problems with this type of system are that it is costly to fabricate and bury the underwater power lines, and the electronics are necessarily subject to corrosion. This is due to the fact that the external water, often seawater, can leak in through rotating seals, and rapidly corrode the copper electronics, as shown by arrow (90).

Another type of tidal turbine is produced by an Australian company, Tidal Energy Pty Ltd. The system uses a venturi turbine that is enclosed in a housing to produce what is claimed to be an efficiency of 3.85 times that of the conventional tidal turbine system. This system also suffers from, the same problems of costly buried electrical cables, as well as salt-water intrusion into subsurface electronics.

A third type of tidal energy system is being developed by a British company, Lunar Energy. This system uses tidal turbine blades to turn a hydraulic oil pump, which delivers high pressure oil to a hydraulic motor/generator located above the shrouded blades.

As shown in FIG. 2, some components are similar from the prior art embodiment of FIG. 1. However, differently from FIG. 1, FIG. 2 shows a fluid pump (100) that pumps low pressure hydraulic liquid (110) to become a higher pressure liquid (120), which activates a hydraulic motor (130) to turn a generator (140), which is immediately adjacent to and submerged with the pump. The electricity then travels to shore by means of a buried power line (150).

This design shown in FIG. 2 is more costly to build, but it greatly minimizes the chance of seawater getting inside of the generator, since the hydraulic liquid is at a higher pressure than the surrounding see, and thus would tend to leak out into the surrounding seawater. It still suffers, however, from the expense of buried electrical cables.

Another type of tidal turbine from Marine Current Turbines (not shown) uses twin propellers that are mechanically attached to an above-surface power turbine. This is basically similar to the conventional tidal turbine, except that two rotors are used to counter each other's torque, and there is the added expense of building, potentially very tall towers that must withstand ocean storms.

SUMMARY

According to a first aspect, a power generation system is provided, comprising: a plurality of submerged mechanical devices, each submerged mechanical device comprising a pump configured to be powered, in operation, by mechanical energy to output a pressurized output liquid flow in a device output conduit, one or more main output conduits connected with the device output conduits of the submerged mechanical devices to combine pressurized output flows output from the submerged mechanical devices into a lower number of pressurized flows, the one or more main output conduits delivering, in operation, the lower number of pressurized flows to a location remote of the submerged mechanical devices for power generation.

According to a second aspect, a power generation method is provided, comprising: providing mechanical devices, each mechanical device comprising a pump, the pump outputting, when powered by mechanical energy, a pressurized output liquid flow in a device output conduit; providing one or more main output conduits; connecting the one or more main output conduits with the device output conduits of the mechanical devices to combine pressurized output flows output from the mechanical devices into a lower number of pressurized flows; and delivering, through the one or more main output conduits the lower number of pressurized flows to a location remote, of the mechanical devices for power generation.

Further embodiments are present in the specification, drawings and claims of the present application.

The teachings of the present disclosure can be applied to all water current energy generation and transfer systems, including tidal currents, ocean currents and river currents. In addition to that, they can be applied to any off-shore energy generation and transfer systems, including wind energy and wave energy. Further, applications on any on-shore or off-shore generation system are also possible, including wind farms, solar farms, or tidal generation systems, especially those that need to store energy to match customer needs. They also apply to any on-shore or off-shore energy transfer system, such as replacing buried power cables across lakes, rivers, tidal areas or ocean areas.

Applicants' solution is unique, given that use of long, high pressure liquid filled pipes with a distant, on-shore generator is an option that has been ignored by other power generating applications that involve tides, rivers, ocean currents, ocean waves, or wind as energy sources.

DETAILED DESCRIPTION

Figure 3:
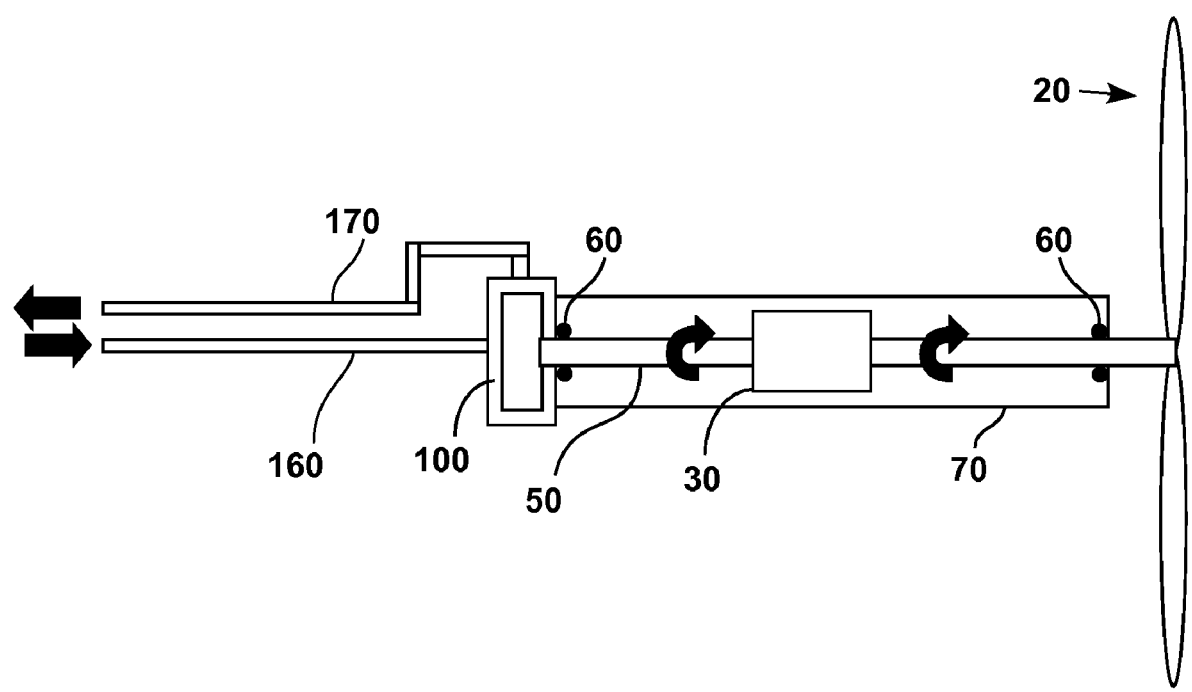
FIG. 3 shows a schematic diagram of the power generator according to the present disclosure.

In the hydraulic tidal power-generator according to the present disclosure, turbine blades spin slowly due to the flow of a river, tidal flow, or ocean current. FIG. 3 shows a schematic diagram of the generator.

Figure 2:
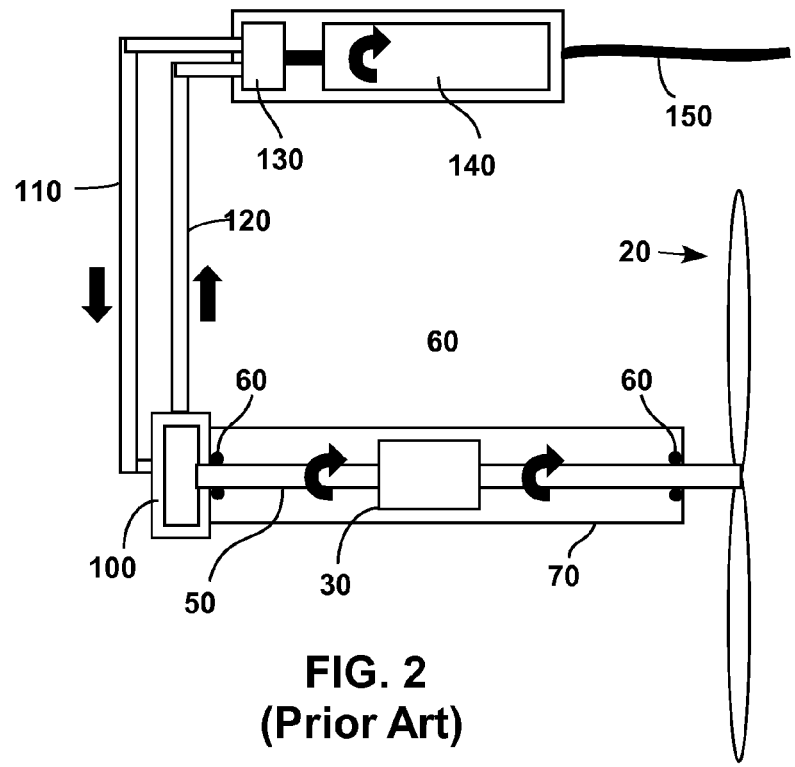
FIG. 2 shows a schematic diagram of a second known tidal turbine.

Differently from what is shown in FIG. 2, the embodiment of FIG. 3 provides for liquid-in low pressure lines or conduits (160) and liquid-out high pressure lines or conduits (170) that extend a great distance to dry land, without requiring the presence of an undersea electric conversion unit like the one shown in FIG. 2. Also differently from what is shown in FIG. 2, the device in FIG. 3 can combine multiple fluid pumps (100) that combine their high pressure flows (170), as later shown in FIGS. 4 and 5.

Figure 4:
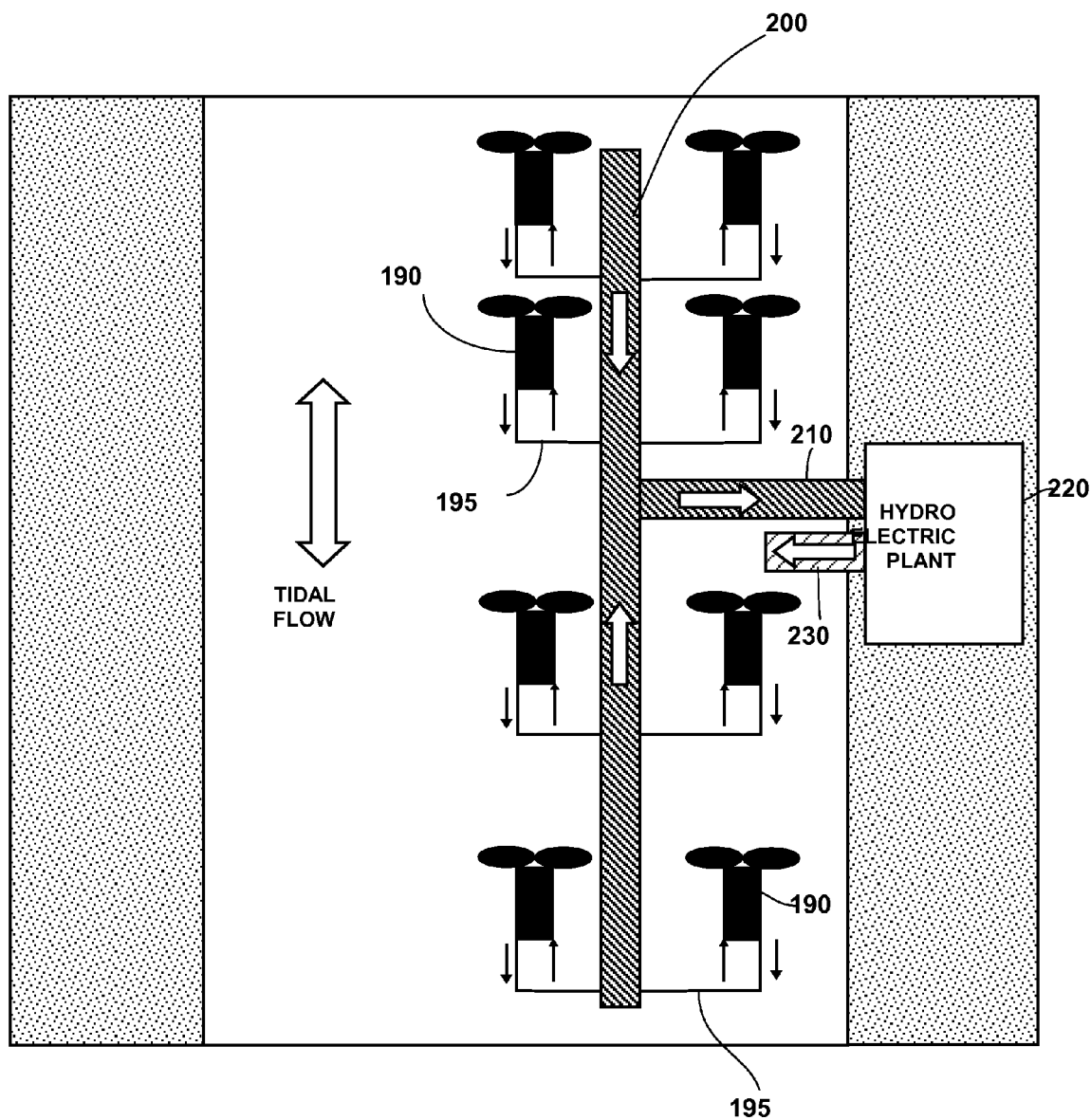
FIG. 4 shows an open cycle mode of operation of the power generator according to the present disclosure.
Figure 5:
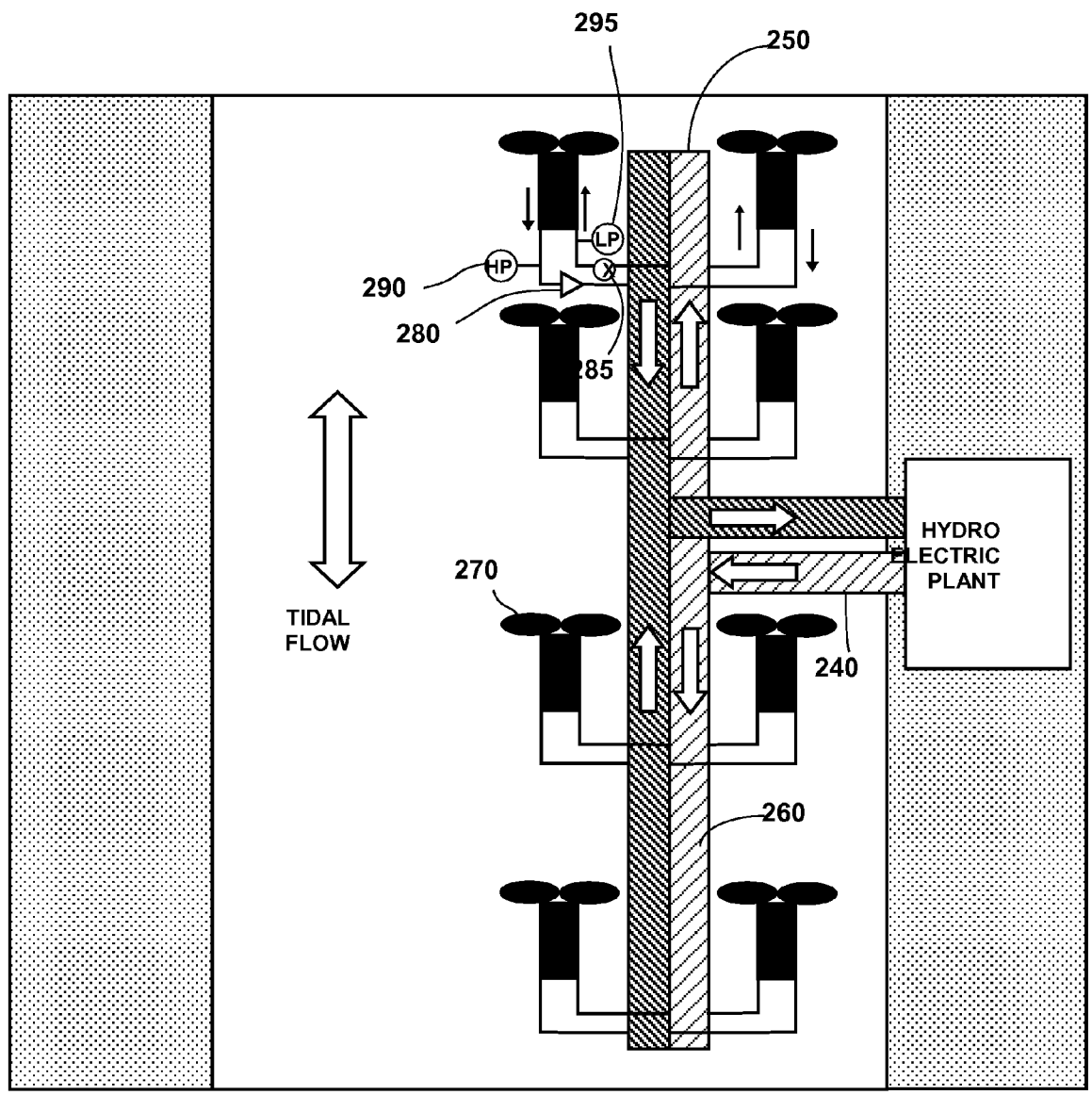
FIG. 5 shows a closed cycle mode of operation of the power generator according to the present disclosure.

The rotor's rotational speed is increased through a gearbox (30), which then drives a high pressure fluid pump (100). The high pressure liquid, such as fresh water, salt water, oil, glycol, water solutions etc, is transported in lines or conduits (170) to a common pipe and then to an on-shore hydroelectric power plant (not shown in the figure). This all-mechanical design is less expensive, more efficient, and eliminates most corrosion and all submerged electrical components. It replaces expensive and dangerous, submerged power cables and power conditioning systems with simple pressurized tubes or conduits, that are pressurized by liquid, as shown in FIGS. 2, 4 and 5. Some examples of the high pressure tubes or conduits are reinforced concrete, which is used in almost all bridges and tunnels in tidal areas, and fiberglass reinforced plastic (FRP) pipes, which are lighter than reinforced concrete pipes. The low pressure tubes or conduits can be similar to the high pressure tubes or conduits, or they can be fabricated from less expensive non-reinforced plastic pipes. The diameter of the high/low pressure tubes or conduits can be of about 10 cm or less, while the diameter of the high and low pressure main tubes or conduits can be about 1 m or more. The distance between, the on-shore hydroelectric plant and the most distant pumps can be about 100 m or more. By way of example and not of limitation, the fluid pump (100) can be a dynamic type pump or a positive displacement pump.

According to further embodiments of the present disclosure, open and closed cycle modes are provided. Schematics of how the system of the present disclosure operates in open and closed cycle modes are shown in FIGS. 4 and 5, respectively.

In the open cycle shown in FIG. 4, where multiple submerged power generators (190) similar to the one of FIG. 3 are shown, the surrounding tidal water is taken into the pump and is pressurized in output conduits (195) before being combined (200) with other pressurized flows from the other turbines or generators (190). The combined or main flow (200) is sent to shore (210) and generates power in a conventional hydroelectric plant (220). The exhausted liquid (230) is then returned to the surrounding water tidal area. Arrows coming out of the turbine devices along conduits (195) represent high pressure liquid sent to the plant (220) through the main output transfer lines or conduits (200), (210). Arrows going into the turbine devices represent low pressure liquid input to the turbine devices for proper operation of the pump.

In the closed cycle design shown in FIG. 5, the returning low pressure main water flow (240) is then separated (250, 260) to allow each individual flow to return to the separate turbine pumps (270). Fresh water with trace bio-inhibitors and corrosion inhibitors can be used for the closed cycle liquid, since the liquid is being recycled through the pumps and the hydroelectric generator.

The main input/output conduits shown in FIGS. 4 and 5 are preferably made with steel-reinforced concrete and can have a diameter of about 1 m or more.

Each high pressure line or conduit (see, e.g., line or conduit (170) in FIG. 3) and low pressure line or conduit (see, e.g., line or conduit (160) in FIG. 3) that connects to the main flow should preferably be flexible in order to allow for turbine motion relative to the main lines or conduits, thus allowing for sway of the submerged turbine pumps with waves and currents.

Furthermore, each high pressure line or conduit is preferably connected by means of a valve (280), e.g., a check valve, so that if the high pressure line or conduit does not build up sufficient pressure, then flows from the other turbines will not backflow into the underperforming turbine. Moreover, each low pressure line or conduit can have a valve (285) so that any leaking or non-operative turbine-pump assemblies can be disconnected from the others. In order to optimize performance of the power generation, monitoring sensors (e.g., pressure gauges) (290), (295) can be placed on the high and low pressure lines or conduit. While presence of a check valve (280) is shown only in the embodiment of FIG. 5, the person skilled in the art will understand that such valve can be used, if desired, also in the open cycle embodiment of FIG. 4.

Looking at FIGS. 3, 4 and 5 in combination, the person skilled in the art will notice that the high pressure liquid line or conduit (170) in FIG. 3 joins up with other high pressure liquid lines or conduits in FIGS. 4 and 5, so that there are fewer main lines or conduits or perhaps only one line or conduit, which goes to shore to power the on-shore hydroelectric power generator. The low pressure lines or conduits (160) of FIG. 3 can be very short, as shown in FIG. 4, if the pump is taking in surrounding seawater (open cycle), or the low pressure lines or conduits (see FIG. 5) can be configured in a manner, similar to the high pressure lines or conduits, so that the same liquid is continuously recycled (closed cycle).

As shown in FIGS. 4 and 5, multiple flows are combined to make a much larger flow or much larger flows that travel a long distance to shore. As also mentioned above, the liquid can be water, like fresh water or salt water. Therefore, the large amounts of high pressure water obtained in accordance with this disclosure increase hydroelectric generation efficiency. Possible motion between the tidal turbines and the large main water lines or conduits can be taken into account by providing small flexible lines or conduits, such as reinforced plastic pipes or carbon wound epoxy pipes. Moreover, as also mentioned above, presence of diode check valves on the high pressure lines or conduits and valves on the low pressure lines or conduits allows the entire system to work also if one or more of the pump units fail. As also mentioned with reference to the description of FIG. 3, additional types of liquids suitable for use with the present disclosure include oil, glycol and water solutions. The conduit schematics shown in FIGS. 4 and 5 can also be used to allow the mechanical energy from off-shore wind or waves to mechanically power a series of pumps that are connected in such a way, so as to transport pressurized liquid a great distance to a location on-shore, where the liquid flow is converted to electricity by means of a hydroelectric plant. In the case of wave energy, the wave energy may be harvested by means of producing a rotating motion or a back-and-forth motion, both of which can mechanically power a liquid pump.

Figure 6:
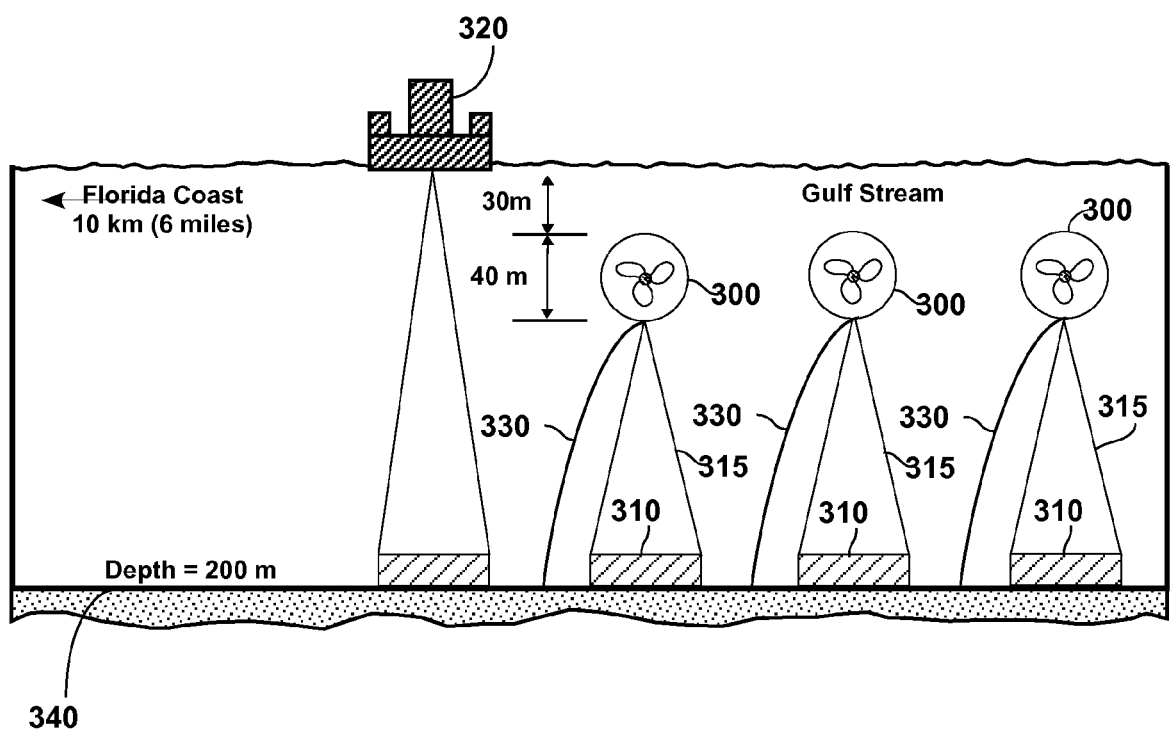
FIG. 6 shows a schematic representation of how the power generator according to the present disclosure can work in the Gulf Stream.

A schematic of how the system according to the present disclosure might look in a deep ocean current is shown in FIG. 6. For this design, Which could be used in the Gulf Stream, the cowlings (300) for the turbines (e.g., 1 MW turbines) are buoyant, but do not float, and they are anchored to heavy weights (310) in the sea floor by means of anchor lines (315). Each high pressure line or conduit (330) could be connected to an above surface platform (320) acting as an optional off-shore energy station or a subsurface platform (not shown), where the high pressure flow is converted to electricity, which is cabled to shore. Alternatively, the high pressure liquid flow could be piped to shore, where it is converted to electricity in an on-shore hydroelectric plant. The conduits (330) shown in FIG. 6 can be, for example, small flexible pipes (0.1 m diameter by about 130 m long for 1 MW power). The flexible pipes can be made, for example, of fiberglass reinforced plastic (FRP). Also shown in FIG. 6 is a main conduit (340) to which the turbine conduits (330) are connected. The main conduit (340) has, for example, a 1 m diameter.

Calculations made by the inventors showed that relatively small pipes can be employed for long distance energy transfer. For a 100 MW on-shore hydroelectric plant that is 10 km from a series of underwater pumping devices, a pipe diameter of 1 m would be required for a 3000 psi flow, assuming a 10% pressure drop. Lower pressures and/or lower pressure drop losses would result in larger required pipe diameters. Moreover, the cost of the applicants' hydraulic pump tidal system has been shown to often cost less than the cost of conventional tidal turbines with buried electronic cables.

Figure 1:
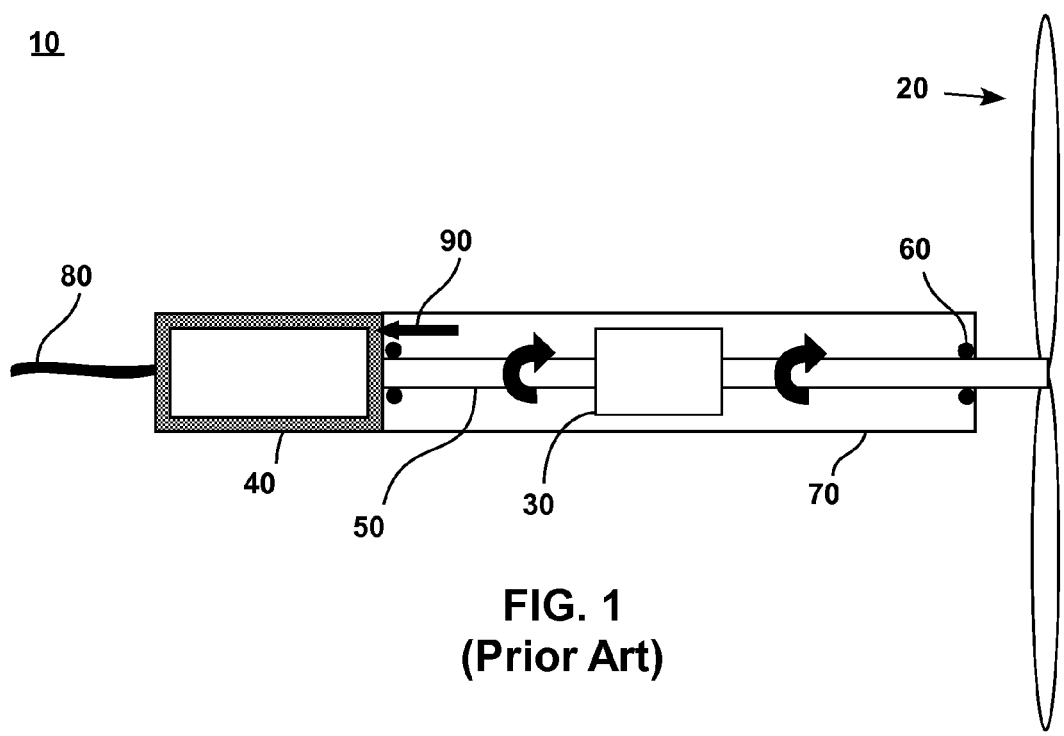
FIG. 1 shows a schematic diagram of a first known tidal turbine.
Figure 7:
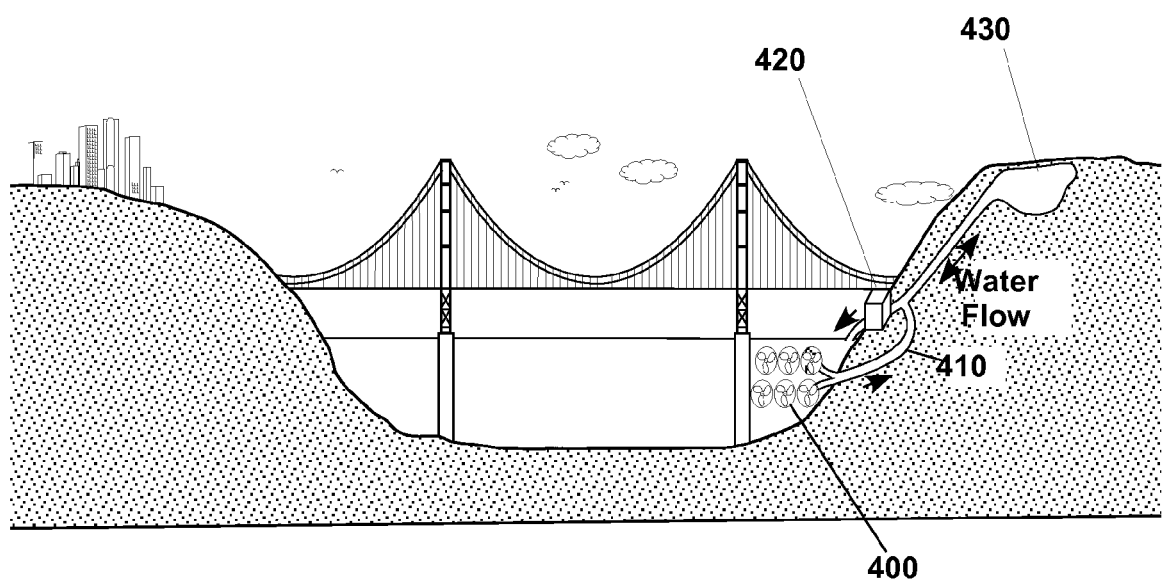
FIG. 7 shows a schematic representation of how the power generator according to the present disclosure can work in the San Francisco Bay Area.

A schematic of how the tidal system might look for a hilly area, such as San Francisco, is shown in FIG. 7. This system is shown as open cycle, but could also be closed cycle if desired. As shown in FIG. 1, multiple tidal pumps (400) deliver high pressure liquid to the shore in a manner similar to what is shown in FIG. 4. The high pressure liquid (410) can be delivered to a hydroelectric plant (420) and/or it can be delivered to an elevated lake (430). If some or all of the liquid is delivered to the elevated lake (430), the water can later be drawn out of the lake and processed through the hydroelectric generator (420) to produce power when it is needed, rather than to produce power only when the tides are flowing. Therefore, the embodiment shown in FIG. 7 uses salt water in case of an open cycle configuration and fresh water in case of a closed cycle configuration. This type of pumped energy storage would also function with fluids that are pumped to higher pressure by means of converting energy from ocean waves, ocean currents, river currents, or wind.

Figure 8:
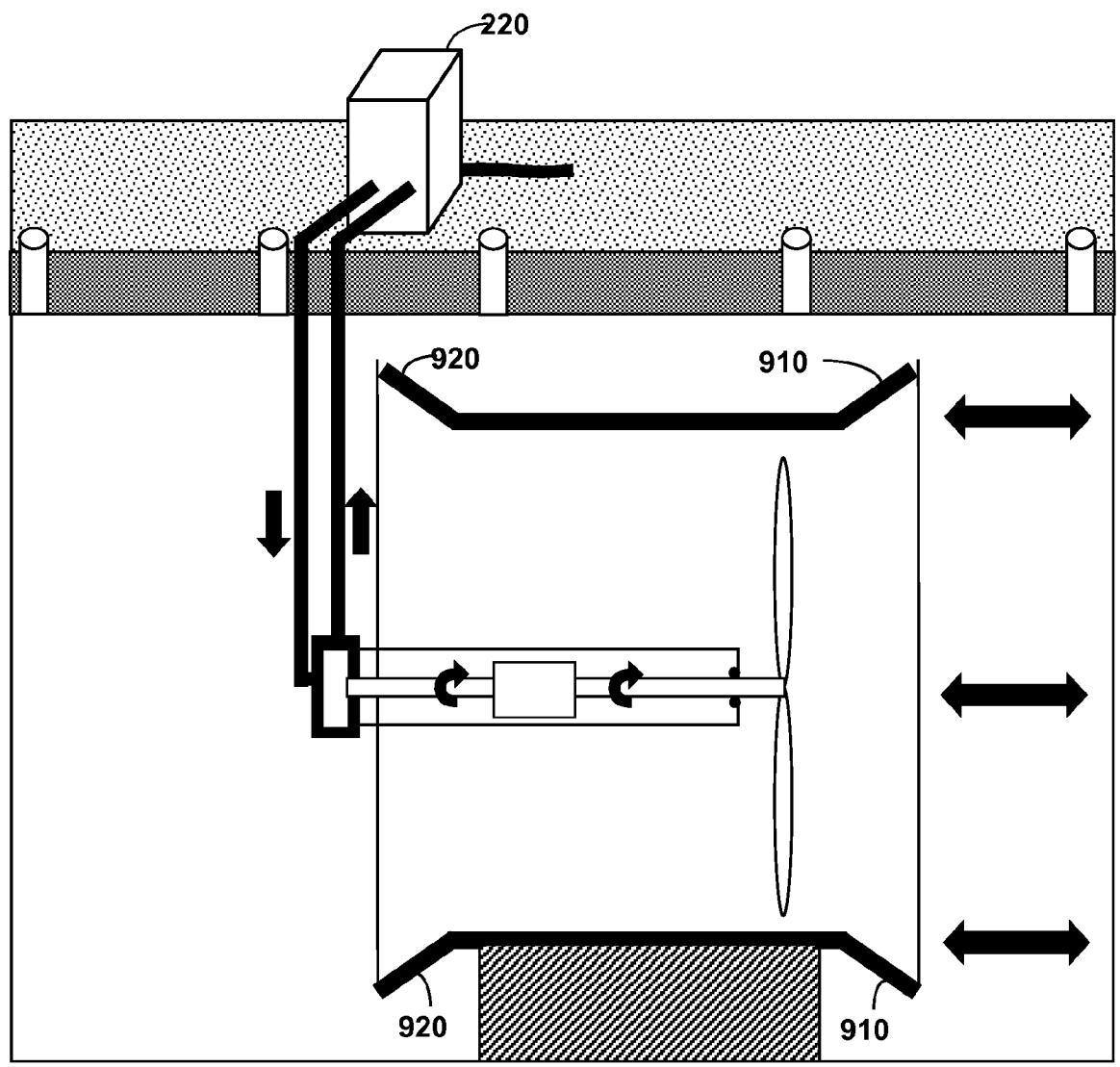
FIG. 8 shows a schematic diagram of a power generator with diverging cowlings for bi-directional water flow.

According to a further embodiment, the tidal system of the present disclosure is also capable of handling reverse flows, See, for example, FIG. 8, where a diverging cowling on both ends (910, 920) of the main cowling is shown. In particular, such optional cowling helps to intensify the stream energy whether it is flowing from the right or left. It also allows for some mismatch and/or turbulence in the primarily directional tidal flows.

Accordingly, what has been shown are power generation systems and methods. While these power generation systems and methods have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

What is claimed is:
1. A power generation system comprising:
a plurality of mechanical devices, each mechanical device comprising a pump configured to be powered, in operation, by mechanical energy to output a pressurized out- put liquid flow in a device output conduit, each mechanical device comprising a device input conduit adapted to receive low pressure fluid;

one or more main output conduits connected with the device output conduits of the mechanical devices, wherein a higher number of device output conduits of smaller cross section is joined to form a lower number of one or more main output conduits of larger cross section to combine pressurized output flows output from the mechanical devices into a lower number of pressurized flows;

the one or more main output conduits of larger cross section delivering, in operation, the lower number of pressurized flows to a location remote of the mechanical devices for power generation; and one or more low pressure conduits, distinct from said one or more main output conduits, and located, in fluid communication, between the location remote of the mechanical devices and the device input conduits of the mechanical devices, wherein a lower number of one or more low pressure conduits of larger cross section divides into a higher number of device input conduits of smaller cross section to deliver, in operation, a lower number of low pressure flows from the location remote of the mechanical devices to the higher number of device input conduits, and wherein a returning low pressure flow returning from the location remote of the mechanical devices is separated into individual flows to allow each individual flow to return to the plurality of mechanical devices via said respective low pressure conduits, such that the pressurized output liquid flow and the returning low pressure flow comprise liquid that is continuously recycled.

2. The system of claim 1, wherein the device output conduits are flexible device output conduits.

3. The system of claim 1, wherein the location is an elevated liquid storage location.

4. The system of claim 1, wherein the location comprises at least one power generator that converts the lower number of pressurized flows into electricity on dry land.

5. The system of claim 1, wherein the pressurized flow is a pressurized liquid flow.

6. The system of claim 5, wherein the pressurized liquid flow substantially consists of water.

7. The system of claim 1, wherein the pump of each mechanical device is connected to a turbine blade by a rotor, such turbine blade being powered by flowing or undulating water or by wind and being able to activate the pump.

8. The system of claim 1, wherein the mechanical devices are underwater turbine devices, the device output conduits are underwater device output conduits, and the one or more main output conduits are substantially underwater, the system further comprising a turbine generator on dry land or on a platform.

9. The system of claim 1, wherein each mechanical device comprises an output conduit disconnecting device to disconnect malfunctioning mechanical devices from the one or more main output conduits.

10. The system of claim 9, wherein the output conduit disconnecting device is a valve located on the device output conduit of said each mechanical device.

11. The system of claim 1, wherein the one or more main input conduits receive liquid from a turbine generator.

12. The system of claim 1, wherein each mechanical device comprises an input conduit disconnecting device to disconnect malfunctioning mechanical devices from the one or more main input conduits.

13. The system of claim 12, wherein the input conduit disconnecting device is a valve located on the device input conduit of said each mechanical device.

14. The system of claim 1, further comprising a hydroelectric energy converter to be connected, in operation with the one or more main output conduits.

15. The system of claim 1, wherein the mechanical devices are submerged mechanical devices.

16. The system of claim 1, wherein either or both of the one or more low pressure conduits and one or more main output conduits are submerged conduits.

17. The system of claim 16, wherein the mechanical devices take mechanical energy from off-shore wind.

18. The system of claim 1, wherein the mechanical devices are off-shore devices and the location remote of the mechanical devices is an on-shore location.

19. The system of claim 1, wherein the mechanical devices are aligned in sequences, the one or more main output conduits and low pressure conduits being interposed between two adjacent sequences, and the sequences extending parallel to the one or more main output conduits and low pressure conduits.

20. A power generation method, comprising:
providing mechanical devices, each mechanical device comprising a pump, the pump outputting, when powered by mechanical energy, a pressurized output liquid flow in a device output conduit, wherein each mechanical device includes a device input conduit;

providing one or more main output conduits;

connecting a lower number of one or more main output conduits of larger cross section with a higher number of device output conduits of smaller cross section to combine pressurized output flows output from the mechanical devices into a lower number of pressurized flows;

delivering, through the one or more main output conduits of larger cross section the lower number of pressurized flows to a location remote of the mechanical devices for power generation; and providing one or more low pressure conduits, the one or more low pressure conduits being of larger cross section than the device input conduits;

wherein a returning low pressure flow returning from the location remote of the mechanical devices is delivered through a lower number of one or more low pressure conduits of larger cross section and is separated into individual flows towards a higher number of device input conduits of smaller cross section to allow each individual flow to return to the plurality of mechanical devices, such that the pressurized output liquid flow and the returning low pressure flow comprise liquid that is continuously recycled.

21. The method of claim 20, wherein the lower number of pressurized flows are delivered to a generator.

22. The method of claim 21, wherein the generator is a turbine generator.

23. The method of claim 21, wherein the mechanical devices are submerged mechanical devices and the generator is an above water generator.

* * * * *